June 12, 1962 M. C. STEBBINS 3,038,436

ALARM DEVICE

Filed March 18, 1960 5 Sheets-Sheet 1

INVENTOR.
MARK C. STEBBINS
BY
Barnes, Kisselle, Raisch & Choate
ATTORNEYS

ALARM DEVICE

Filed March 18, 1960 5 Sheets-Sheet 2

INVENTOR.
MARK C. STEBBINS
BY
Barnes, Kisselle, Raisch & Choate
ATTORNEYS

June 12, 1962 M. C. STEBBINS 3,038,436

ALARM DEVICE

Filed March 18, 1960 5 Sheets-Sheet 3

INVENTOR.
MARK C. STEBBINS
BY
Barnes, Kisselle, Raisch & Choate
ATTORNEYS

INVENTOR.
MARK C. STEBBINS
BY
Barnes, Kisselle, Raisch & Choate
ATTORNEYS

INVENTOR.
MARK C. STEBBINS
BY
Barnes, Kisselle, Raisch & Choate
ATTORNEYS

United States Patent Office 3,038,436
Patented June 12, 1962

3,038,436
ALARM DEVICE
Mark Charles Stebbins, 6045 Oakman Blvd., Detroit, Mich.
Filed Mar. 18, 1960, Ser. No. 15,945
20 Claims. (Cl. 116—9)

The alarm device of this invention is especially adapted to be mounted on or adjacent a door or the like to provide an alarm should the door be opened by unauthorized persons. A characteristic of the device is that it can be set selectively by means of a key-operated lock at an Off or non-operating position and an On position. Once the alarm is set off, it can not be turned off or reset except by removing the device from its mount to gain access to the works contained in the outer housing. Accordingly, the lock has a third position in which the device can be removed from its mount.

An object of the invention is to provide a simple, improved, inexpensive structure facilitating this type of operation. In general the invention is carried out by providing a tailpiece on the lock which cooperates with the mount to secure the device in place and which selectively secures the triggering means for the alarm mechanism in either a non-operating condition or a condition for actuating the alarm mechanism should the door or the like be opened.

Figures 1, 2:
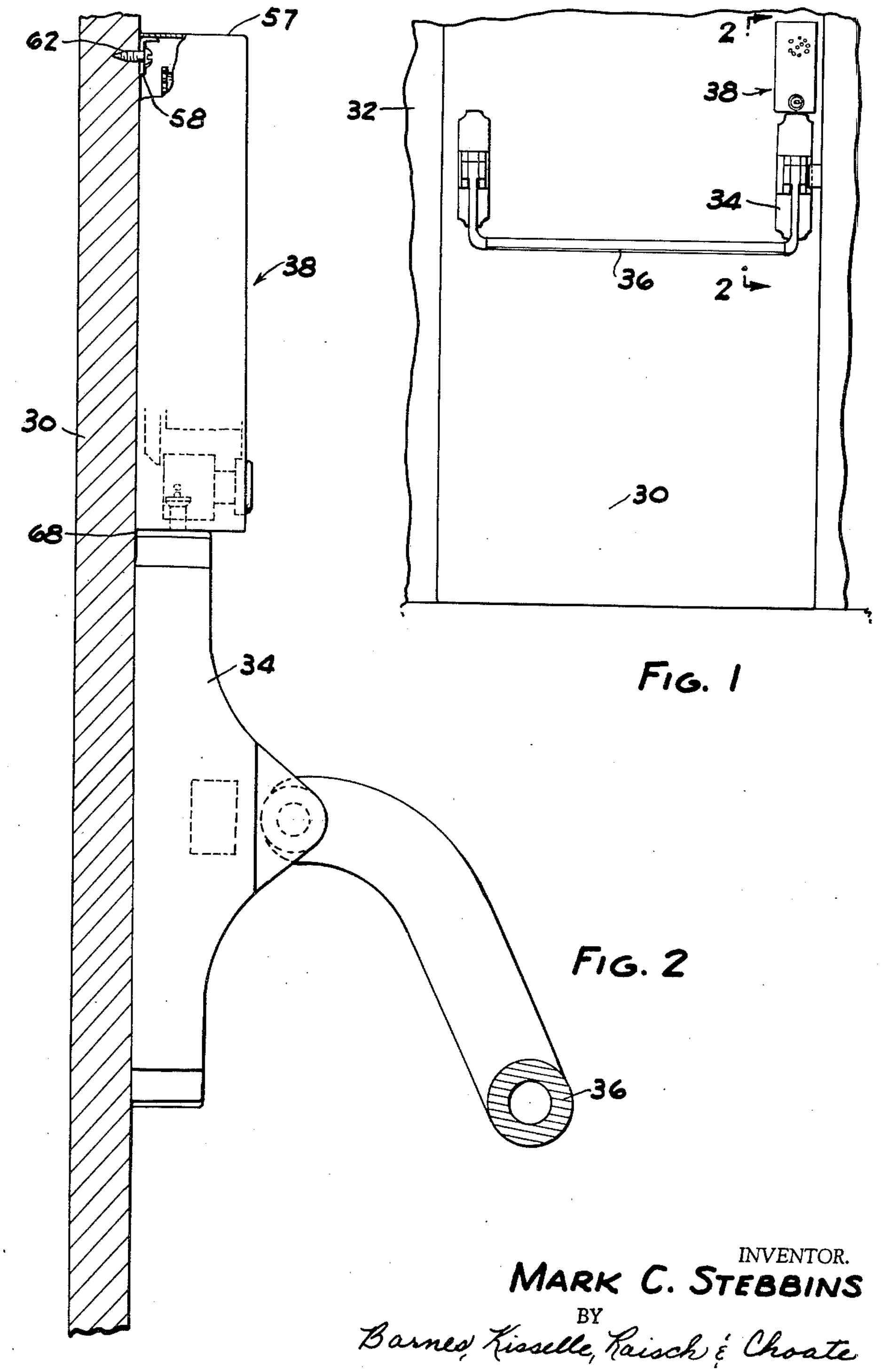
FIG. 1 is an elevational view illustrating an alarm according to this invention mounted on a door.
FIG. 2 is an enlarged fragmentary sectional view on line 2—2 of FIG. 1.

Shown in FIG. 1 is a door 30 mounted for swinging on a vertical axis in a door frame 32 and having a conventional latch mechanism 34 operated by depressing a conventional panic bar 36. An alarm device 38 according to this invention is mounted in conjunction with latch mechanism 34. Latch 34 is modified by providing an opening (not shown) in the top of its outer casing 40 and by projecting a plunger 42 through the opening for operative connection to the latch mechanism by suitable means (not shown). A hollow stud 44 is secured to the latch casing and this stud provides a guide for plunger 42. Stud 44 has a head 45 and also provides means for securing alarm device 38 on the door as will appear more in detail below.

The alarm device includes an outer cover or housing 46 within which the alarm mechanism 48 is mounted. The alarm mechanism illustrated includes a noise making device such as a conventional siren 50 driven by means of a gear 52 forming a part of the siren shaft (not shown) and driven by a gear train powered by means of a conventional coil spring motor 54 having a conventional ratchet and pawl wind up device which can be operated by a suitable key inserted in a slot 56 on the coil spring shaft.

Secured to the top 57 of housing 46 is an inwardly or downwardly extending flange 58 having a pair of recesses 60 which can be hooked over a pair of screws 62 imbedded in door 30 so that the heads of the screws anchor the upper portion of the housing to the door. The opposite or lower wall 64 of housing 46 has a slot 66 which opens through the rearward edge 68 of wall 64 for receiving stud 44.

Figure 3:
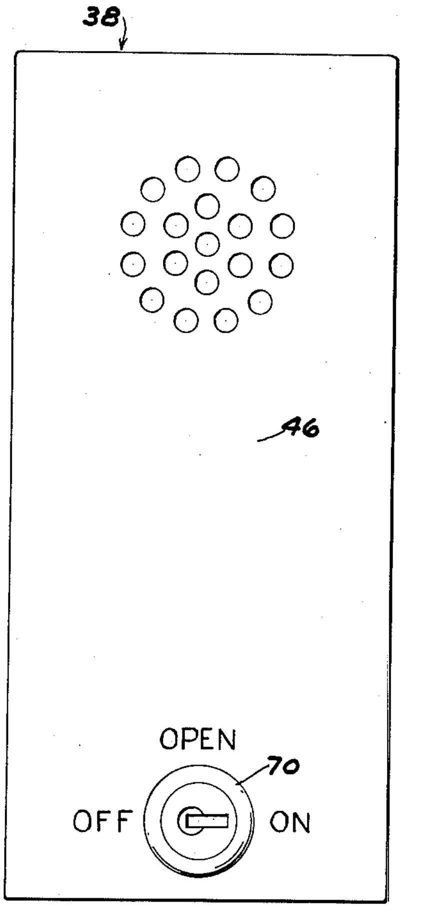
FIG. 3 is an enlarged elevational view of the front face of the alarm casing.
Figure 5:
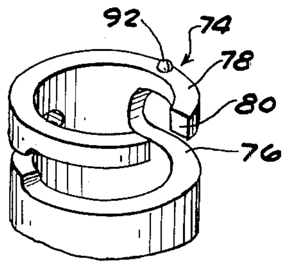
FIG. 5 is a further enlarged perspective view of the tailpiece on the lock.

A tumbler type lock 70 is mounted on housing 46 and is turnable selectively to an Off position, an On position and an Open position as represented in FIG. 3 by means of a key 72. The lock has a tailpiece 74 which turns responsive to turning key 72 and this tailpiece both serves to lock housing 46 onto door 30 and serves to actuate the alarm mechanism or secure the mechanism against actuation. Tailpiece 74 has the form of a hollow cylinder with one wall cut away to provide a circumferentially extending slot 76 and the end 78 of the tailpiece is cut away to provide an axial entrance slot 80 into slot 76. Slot 80 is preferably located generally centrally of slot 76 and is dimensioned for passing around stud 44.

Tailpiece 74 carries a curved leaf spring 82 which extends circumferentially around a portion of the exterior of the tailpiece. Spring 82 has a free end portion which is recessed as at 84 (FIG. 7) for engaging a trigger element 86 mounted within the housing by such means as brackets 88 and 90 which slidably engage upper portions of the trigger element. Tailpiece 74 also has an axial projection 92 for a purpose to be described.

Figure 4:
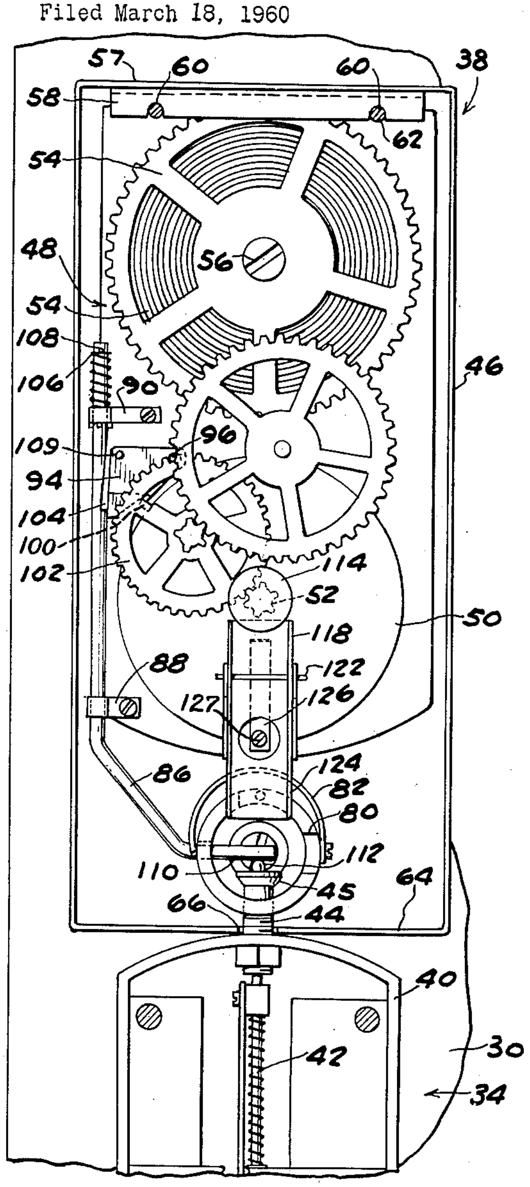
FIG. 4 is an enlarged rear view of the alarm shown in FIG. 2 together with portions of a latch mechanism.
Figure 6:
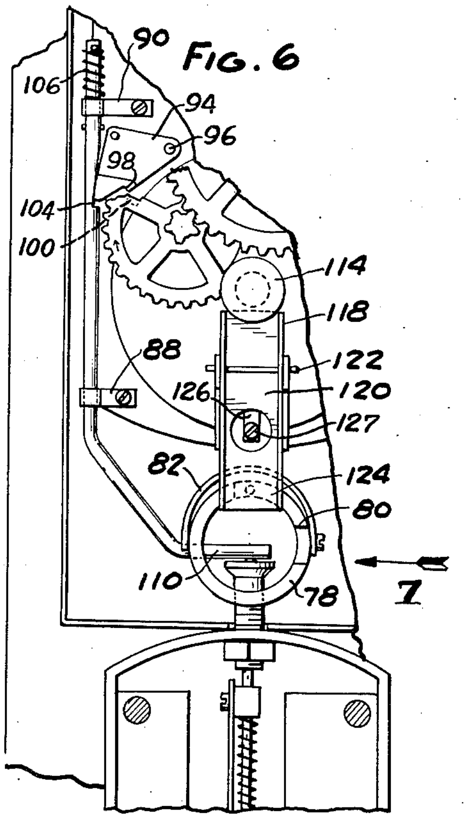
FIG. 6 is a fragmentary view similar to FIG. 4 but showing a different relation of the parts.
Figures 10, 11:
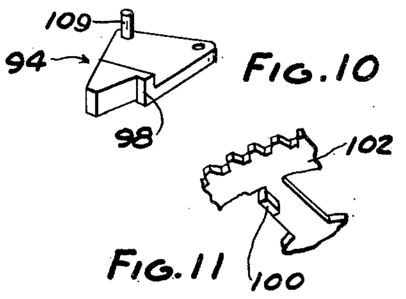
FIG. 10 is a further enlarged perspective view of a release element in the actuating means for the alarm mechanism.
FIG. 11 is a further enlarged fragmentary perspective view of another part of the release train.

The trigger train for siren 50 includes trigger element 86, a catch element 94 pivotally mounted at 96 and having a shoulder 98 (FIGS. 6 and 10) engageable by a struckout lug 100 on a spoke of a gear 102 in the siren driving gear train (FIGS. 4 and 11). Catch 94 is biased for swinging in a clockwise direction as FIGS. 4 and 6 are viewed by a suitable spring not shown. Trigger element 86 has a notch 104 into which catch 94 may snap for shifting shoulder 98 out of the way of lug 100 to release siren 50 for operation. Trigger 86 is biased upwardly as FIGS. 4 and 6 are viewed by a spring 106 compressed against bracket 90 and reacting upwardly against a pin 108 carried by trigger 86. Catch 94 carries a stud 109 forming a finger hold for resetting the catch. Trigger 86 has a free end portion 110 which projects through circumferential slot 76 in tailpiece 74 for engagement by the end 112 of plunger 42.

The end of the driving shaft for siren 50 carries an exposed head 114 providing a braking surface (FIG. 9) 116 for engagement by an end portion 118 of a braking lever 120 having a pivotal mount 122. The other end portion 124 of the braking lever projects over the end face 78 of tailpiece 74 for engagement by projection 92. End 118 of the braking lever is urged against braking surface 116 by a leaf spring 126 anchored at one end adjacent the siren housing by a screw 127 as shown in FIGS. 4 and 6.

In use, it may be assumed that latch 34 has been mounted on door 30 in a conventional manner and that stud 44 and plunger 42 have been added to the latch mechanism as described. To mount the alarm device 38 on the door, key 72 is inserted into lock 70 and is turned to Open position. This aligns tailpiece slot 80 with slot 66 in the bottom of housing 46. Flange recesses 60 are hooked over screws 62 and the bottom 64 of the housing is swung inwardly against door 30, slots 66 and 80 passing over stud 44 in this movement. Key 72 is then turned either to the Off position or to the On position and in either movement, slot 80 is rotated away from stud 44 which enters the adjacent circumferential slot 76 to secure the housing in place.

Figure 8:
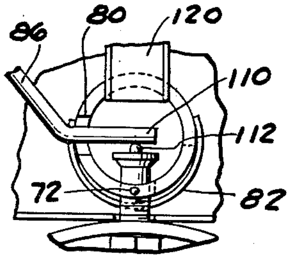
FIG. 8 is a fragmentary view similar to FIG. 4 showing a different relation of the parts.
Figure 9:
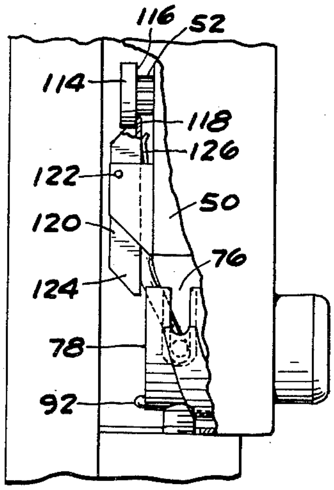
FIG. 9 is a view similar to FIG. 7 but showing a different relation of the parts.

Assuming that the key has been turned to the Off position, the parts will be in the relation illustrated in FIGS. 8 and 9. Stud 92 is disengaged from brake lever 120 and spring 126 urges lever end 118 into braking engagement against surface 116 to secure siren 50 against operation. The free end of spring 82 is out of engagement with trigger element 86. The trigger train is in the condition illustrated in FIG. 4 with trigger element 86 in its upward position so that notch 104 is disaligned from the end of catch 94 so that the catch is held inwardly with its shoulder 98 positioned for engagement by lug 100 on gear 102.

Figure 7:
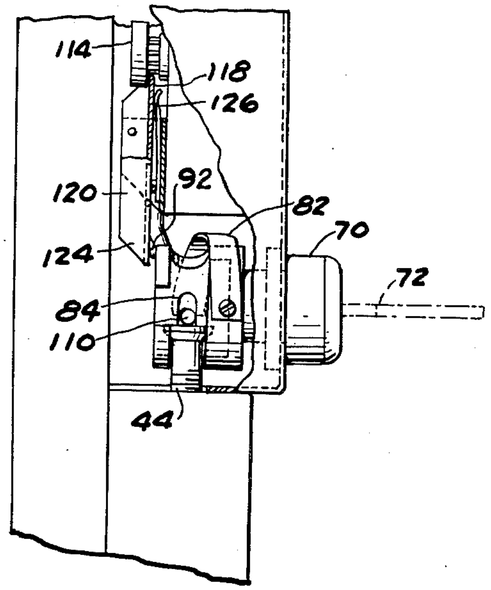
FIG. 7 is a fragmentary elevational view with parts broken away looking in the direction of arrow 7 in FIG. 6.

To condition the alarm device for actuation, key 72 is turned to rotate tailpiece 74 approximately 180° to the On position shown in FIG. 4. Projection 92 engages brake lever 122 so that its end 118 is shifted out of engagement with braking surface 116 against the action of spring 126 as shown in FIG. 7. If lug 100 is not already engaged against stop shoulder 98, the siren gear train turns until the lug and shoulder interengage. The free end 84 of spring 82 is engaged against the lower end of trigger element 86 and is resiliently sprung away from the outer surface of tailpiece 74 so that it is stressed to exert downward force on the trigger element. Downward movement of the trigger element is restrained by the upper end 112 of plunger 42. This relation of the parts is illustrated in FIG. 4.

When the door latch mechanism is operated by depressing panic bar 36 for opening door 30, plunger 42 is lowered and spring 82 thereupon forces trigger element 86 downwardly against the action of spring 106 to bring slot 104 into alignment with the end of catch 94 which snaps into slot 104 carrying shoulder 98 out of engagement with lug 100. Siren 50 is thereby set into operation and sounds the alarm. Thereafter, even if panic bar 36 is released, notch 104, under the action of spring 106, secures catch 94 in released position and the alarm will continue to operate. The alarm can not be shut off without removing housing 46 entirely from its mount to gain access to the inner works of the alarm device and this can not be done without a key 72 to operate lock 70 and turn tailpiece 64 to Open position. Thus, once an unauthorized person sets off the alarm by opening door 30, he can not silence it.

To remove the alarm device for resetting, lock 70 is operated to Open position wherein tailpiece slot 80 is again aligned with stud 44. Lower end 64 of housing 46 can then be swung outwardly and flange 58 unhooked from screws 62. Stud 109 on catch 94 is manually forced downwardly and trigger 86 shifts downwarly against the action of spring 106 to enable catch 94 to swing in a counter-clockwise direction until its lower end clears slot 104, whereupon spring 106 shifts trigger 86 upwardly again to the FIG. 4 position. Catch shoulder 98 is again positioned for engaging stop lug 102. Spring motor 54 may be wound up by turning a key, not shown, inserted into slot 56. The motor may be wound up either before or after catch 94 is reset since in turning tailpiece 74 to Open position, projection 92 disengaged from lever end 124 and spring 126 returned lever end 118 to braking engagement against surface 116. Housing 46 is again mounted on door 30 in the manner described and lock 70 is again turned to either On or Off position.

The Off position is utilized when it is desired to use door 30 without setting off the alarm. In this position, free end 84 of spring 82 is disengaged from trigger 86 so that spring 106 holds trigger 86 upwardly even though plunger 42 is depressed incident to opening door 30. Consequently, the trigger train is not released. Also, in the Off position brake lever 120 is operably engaged against head 102 on the siren shaft to secure the siren against operation.

To again condition the device for sounding an alarm, lock 70 is operated to On position which releases the brake and stresses spring 82 downwardly against the trigger as described. If door 30 is not opened while the alarm is turned to On position it may then be turned to Off position wherein it will remain inactive even though latch mechanism 34 is operated for opening the door.

The modified form of the invention illustrated in FIGS. 12 through 18 is generally similar to the form described except that outer housing 140 is provided with a detachable back plate 142 anchored on the top 144 of a door frame by such means as screws 146. This device is provided with a plunger 148 extending to the exterior of the housing for direct engagement against door 30 so that the alarm is set off by movement of the door itself.

Back plate 142 has secured adjacent one end of back plate 142 an off set hook plate 150 into which an inwardly extending flange 152 on housing 140 is hooked for securing one end thereof in place. Adjacent the other end of the back plate is a post 154 having lateral studs 156 forming a stationary part of a bayonet type connection between the housing and back plate. The movable part of the bayonet connection comprises a tailpiece 158 on lock 70. Tailpiece 158 has a reentrant slot with an axial opening 160 which can be passed over studs 156 and circumferential portions 162 within which the studs engage to lock housing 140 to the back plate. Tailpiece 158 has an end surface 164 with a projection 166 thereon which is engageable with end portion 124 of brake lever 120. Tailpiece 158 has a cylindrical outer surface portion 170 and a cut away portion forming a recess 172.

In this form of the invention, the trigger train includes a trigger lever 174 pivotally mounted at 176 and having an end portion 178 which engages surfaces 170 and 172 of tailpiece 158 in different positions of the tailpiece. The trigger is engageable with the inner end of plunger 148 or its leaf spring mount 180 and has a rounded cam shaped end portion 182 engageable with an extension 190 of stud 109 on catch 94. In this case, catch 94 is restrained from free rotation on its pivot by frictional engagement therewith of a leaf spring 192. Leaf spring 180 is fastened within housing 140 as by welding at 194. A coil spring 196 is anchored within housing 140 at 198 and is connected to trigger lever 174 at 200. This spring is tensioned to urge end portion 178 of the trigger lever against tailpiece 158.

Figure 16:
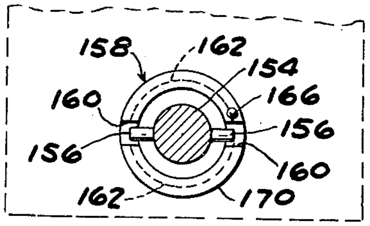
FIG. 16 is a fragmentary view illustrating the locking feature of the device.
Figure 17:
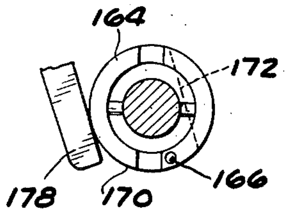
FIG. 17 is another fragmentary view of the locking device illustrating its cooperation with the trigger for the actuating mechanism.
Figure 18:
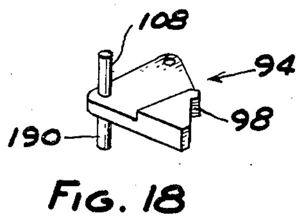
FIG. 18 is a perspective view of a release element in the actuating mechanism.

Operation of this form of the invention is generally similar to the previously described form. It may be assumed that back plate 142 has been fastened to the top of the door frame by screws 146. To mount the alarm device on the door frame, key 72 is turned to Open position. Flange 152 is hooked over plate 150 and housing 140 is swung against plate 142. Axial portions 160 of the slot in tailpiece 158 are aligned with and pass over studs 156 (FIG. 16). The key may then be turned to either the On position or the Off position and in both of these positions studs 156 enter circumferential slot portions 162 to lock the alarm device in place. If the lock is turned to Off position, projection 166 on the end of the tailpiece will be disengaged from brake lever 120 and siren 50 will be secured against operation as described above. Also in the Off position, end 178 of the trigger lever will be engaged against surface 170 of the tailpiece so that it can not move inwardly to operate the trigger train for actuating siren 50 (FIG. 17). Door 30 may be opened and closed without setting off the alarm.

Figures 12, 13, 14:
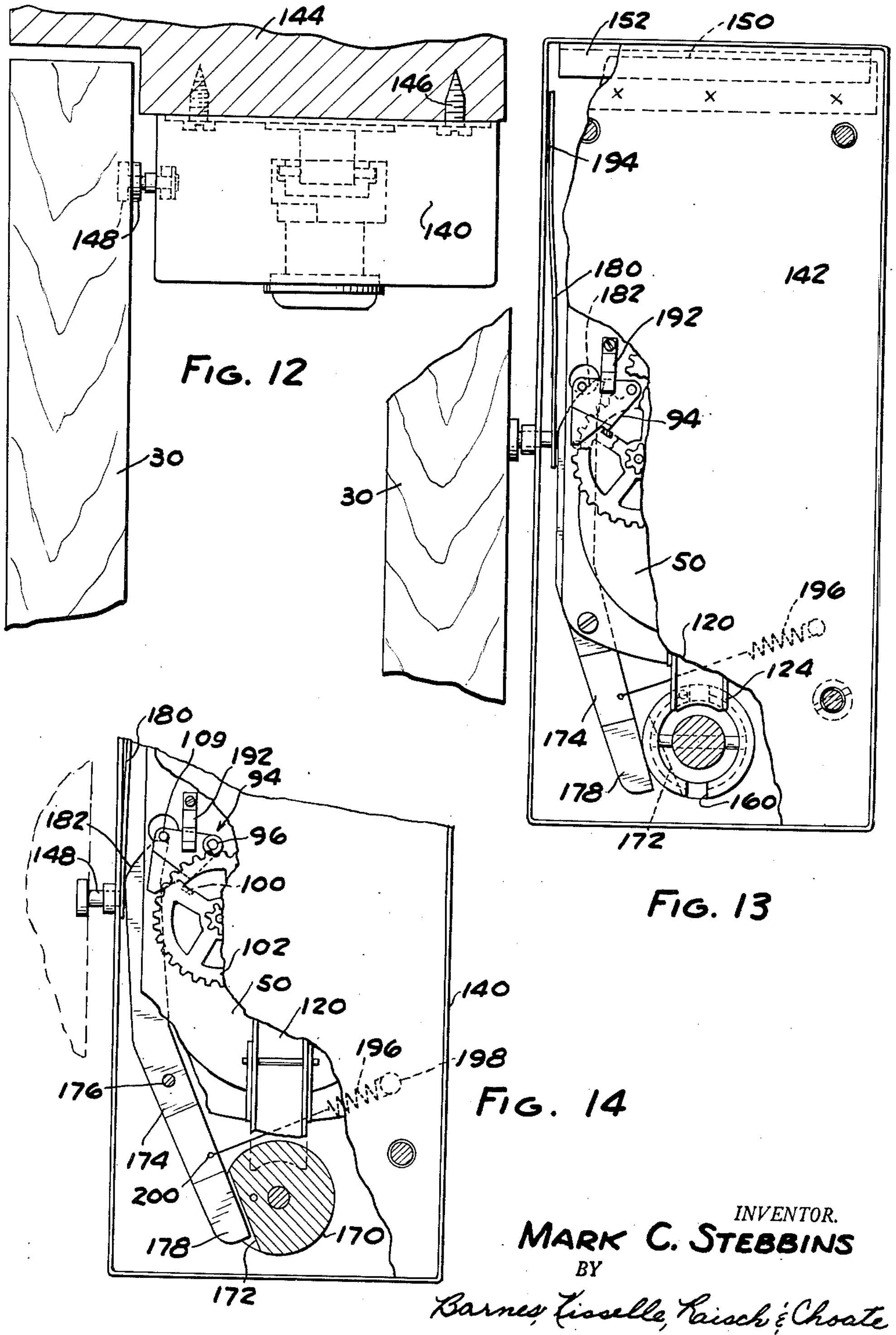
FIG. 12 is an elevational view illustrating a modified form of the invention mounted on the top of a doorway and an adjacent door.
FIG. 13 is a rear view of the device shown in FIG. 12 with parts broken away.
FIG. 14 is a fragmentary view generally similar to FIG. 13 partially in section and with parts broken away showing a different relation of the parts.
Figure 15:
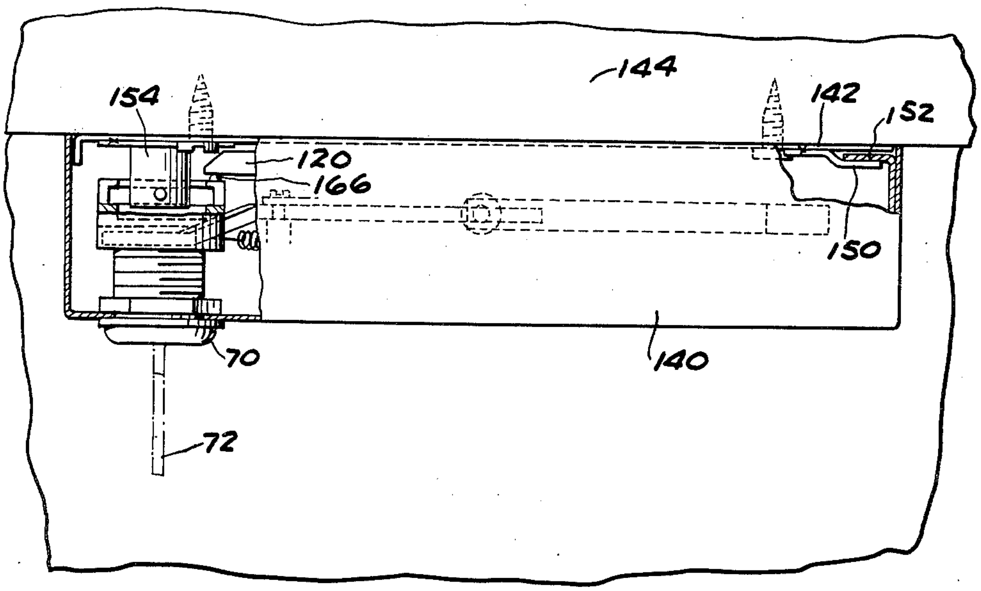
FIG. 15 is a side elevation of the modified form of the invention with parts broken away to illustrate the mounting means for the device and other structural details.

When door 30 is closed, it engages the outer end of plunger 148 and pushes the plunger inwardly so that its inner end or a portion of spring 180 to which it is secured engages an intermediate portion of trigger lever 174 and prevents the trigger lever from swinging in a counterclockwise direction as FIG. 13 is viewed under the action of spring 196. Stop 94 has been swung counter-clockwise until stud extension 190 engages cam surface 182. The stop is frictionally secured in this position by spring 192. Stop shoulder 98 is positioned for engaging lug 100 on gear 102.

To condition the alarm for operation, lock 70 is turned to On position and this engages projection 166 beneath brake lever 120 to release the siren brake as described. If lug 100 is not already engaged against shoulder 98, gear 102 rotates until stopped by interengagement of the lock and shoulder. In turning tailpiece 158 to On position, recessed portion 172 thereof is rotated into alignment with end 178 of the trigger lever. End 178 is restrained against entering the recess by engagement of plunger 148 with the trigger lever as described.

When door 30 is opened, it disengages plunger 148 and trigger lever 172 is rocked counter-clockwise by spring 196, the lower end of the trigger lever entering recess 172. During this movement, surface 182 cams catch stud 190 in a clockwise direction thereby withdrawing shoulder 98 from engagement with lug 100 and the siren is set into operation.

Thereafter, even though door 30 may be reclosed and the trigger lever thereby returned from its FIG. 14 position to its FIG. 13 position, spring 192 frictionally secures stop 94 in its FIG. 14 position wherein stop 98 is displaced from the path of lug 100. Thus, as in the first form of the invention described, once the siren has been set into operation it can not be stopped except by removing housing 140 from its mount and this can only be done by an authorized person having a key.

To reset the alarm, lock 70 is operated to Open position to bring axial slot portions 160 into alignment with studs 156 so that housing 140 can be swung away from plate 142 and hooks 150 and 152 disengaged. In returning the tailpiece to Open position projection 166 disengages brake lever 120 and the siren brake is thereby engaged. Also cylindrical surface portion 170 is turned into engagement with trigger end 178 thereby camming the trigger lever in a clockwise direction against the action of spring 196 and rocking cammed end 182 of the trigger lever inwardly. Stud 109 on stop 94 is manually pushed downwardly as FIGS. 13 and 14 are viewed to rock the stop in a counter-clockwise direction to return shoulder 98 into the path of lug 100. This re-engages stud projection 190 against cam surface 182. The coil spring motor may be wound up as previously described and the device is again ready for operation.

Housing 140 is again mounted on back plate 142 and key 72 turned either to an Off or On position as desired.

It is to be noted that in both forms of the invention, housing 46 or 160 can not be removed from its mount for tampering with the alarm mechanism by persons not having a key which will fit lock 70.

I claim:

1. An alarm adapted to be mounted on a member such as a door movable relative to another member such as a door frame, said alarm comprising, a housing containing an alarm transmitting device, said housing having mounting means which includes a stud adapted to be anchored relative to a door or the like, said mounting means also including a key-operated lock having a tailpiece within said housing, said tailpiece having a slot with an entrance, said tailpiece being rotatable responsive to operation of said lock to an Off position, an On position, and an Open position, said entrance being aligned with said stud in said Open position to facilitate engagement and disengagement of said stud and tailpiece, said slot engaging said stud in said Off and On positions to secure said housing adjacent a door or the like relative to which said stud is anchored, means providing a trigger mechanism mounted in said housing operable to releasably restrain operation of said alarm transmitting device, said trigger mechanism including a trigger element movable in one direction to activate said trigger mechanism for releasing said alarm transmitting device for operation, said trigger mechanism in activated condition being ineffective upon return movement of said trigger element to restrain continued operation of said alarm transmitting device, means in said housing operative in said Off position of said tailpiece to provide a first restraint against movement in said one direction of said trigger element, said first restraint being relieved responsive to turning of said tailpiece to said On position thereof, spring means in said housing operable in said On position of said tailpiece to urge said trigger element in said one direction, and means forming a plunger extending from the interior of said housing to the exterior thereof and having an operative connection with said trigger element, said plunger being movable between a first position and a second position, said plunger in said first position providing a second restraint against movement of said trigger element in said one direction, said second restraint being relieved responsive to movement of said plunger to said second position whereby to release said trigger element for actuating said alarm transmitting device.

2. The combination defined in claim 1 and including in addition means in said housing forming a brake releasably securing said alarm transmitting device in inactive condition, said tailpiece including means operable to release said brake responsive to turning of said tailpiece to said On position thereof, and means operable responsive to turning of said tailpiece from said On position to re-engage said brake, whereby to inactivate said alarm transmitting device independently of said trigger mechanism.

3. The combination defined in claim 2 wherein said brake includes a brake member spring urged into braking engagement with an element of said alarm transmitting device, said means operable to release said brake including a projection on said tailpiece engageable with said brake member for shifting the same to released condition, said means operable to re-engage said brake comprising the spring-urging on said brake member.

4. The combination defined in claim 3 wherein said brake member comprises a lever one end of which is spring urged into braking engagement with said element of said alarm transmitting device, said tailpiece having a surface from which said projection extends, the other end of said lever extending over said surface for engagement by said projection.

5. An alarm adapted to be mounted on a member such as a door movable relative to another member such as a door frame, said alarm comprising, a housing containing an alarm transmitting device, said housing having mounting means which includes a stud adapted to be anchored relative to a door or the like, said mounting means also including a key-operated lock having a tailpiece within said housing, said tailpiece having a slot with an entrance, said tailpiece being rotatable responsive to operation of said lock to an Off position, an On position, and an Open position, said entrance being aligned with said stud in said Open position to facilitate engagement and disengagement of said stud and tailpiece, said slot engaging said stud in said Off and On positions to secure said housing adjacent a door or the like relative to which said stud is anchored, means providing a trigger mechanism mounted in said housing operable to releasably restrain operation of said alarm transmitting device, said trigger mechanism including a trigger element movable in one direction to activate said trigger mechanism for releasing said alarm transmitting device for operation, said trigger mechanism in activated condition being ineffective upon return movement of said trigger element to restrain continued operation of said alarm transmitting device, said tailpiece having a first surface portion engaging said trigger element in said one direction, said tailpiece having a relieved surface portion rotatable into alignment with said trigger element responsive to turning of said tailpiece to said On position whereby to free said trigger element for movement in said one direction into said relieved portion, a spring in said housing urging said trigger element in a direction for shifting into said relieved portion, and means forming a plunger extending from the interior of said housing to the exterior thereof and having an operative connection with said trigger element, said plunger being movable between a first position and a second position, said plunger in said first position providing a restraint against movement of said trigger element into said relieved portion, said restraint being relieved responsive to movement of said plunger to said second position whereby to release said trigger element for actuating said alarm transmitting device.

6. The combination defined in claim 5 wherein said tailpiece has a generally cylindrical outer surface providing said first surface portion, said outer surface being recessed to provide said relieved surface portion, said trigger element comprising a lever one part of which engages said tailpiece, another part of which engages said plunger and a third part of which operably engages said actuating mechanism.

7. The combination defined in claim 5 and including in addition means in said housing forming a brake releasably securing said alarm transmitting device in inactive condition, said tailpiece including means operable to release said brake responsive to turning of said tailpiece to said On position thereof, and means operable responsive to turning of said tailpiece from said On position to re-engage said brake, whereby to inactivate said alarm transmitting device independently of said trigger mechanism.

8. The combination defined in claim 7 wherein said brake includes a brake member spring urged into braking engagement with an element of said alarm transmitting device, said means operable to release said brake including a projection on said tailpiece engageable with said brake member for shifting the same to released condition, said means operable to re-engage said brake comprising the spring-urging on said brake member.

9. The combination defined in claim 8 wherein said brake member comprises a lever one end of which is spring urged into braking engagement with said element of said alarm transmitting device, said tailpiece having a surface from which said projection extends, the other end of said lever extending over said surface for engagement by said projection.

10. An alarm adapted to be mounted on a member such as a door movable relative to another member such as a door frame, said alarm comprising, a housing containing an alarm transmitting device, said housing having mounting means which includes a stud adapted to be anchored relative to a door or the like, said mounting means also including a key-operated lock having a tailpiece within said housing, said tailpiece having a slot with an entrance, said tailpiece being rotatable responsive to operation of said lock to an Off position, an On position, and an Open position, said entrance being aligned with said stud in said Open position to facilitate engagement and disengagement of said stud and tailpiece, said slot engaging said stud in said Off and On positions to secure said housing adjacent a door or the like relative to which said stud is anchored, means providing a trigger mechanism mounted in said housing operable to releasably restrain operation of said alarm transmitting device, said trigger mechanism including a trigger element movable in one direction to activate said trigger mechanism for releasing said alarm transmitting device for operation, said trigger mechanism in activated condition being ineffective upon return movement of said trigger element to restrain continued operation of said alarm transmitting device, means in said housing operative in said Off position of said tailpiece to provide a first restraint against movement in said one direction of said trigger element, spring means in said housing operable to overcome said first restraint and urge said trigger element in said one direction responsive to turning of said tailpiece to said On position thereof, means forming a plunger extending from the interior of said housing to the exterior thereof and having an operative connection with said trigger element, said plunger being movable between a first position and a second position, said plunger in said first position providing a second restraint against movement of said trigger element in said one direction, said second restraint being relieved responsive to movement of said plunger to said second position whereby to release said trigger element for actuating said alarm transmitting device.

11. The combination defined in claim 10 and including in addition means in said housing forming a brake releasably securing said alarm transmitting device in inactive condition, said tailpiece including means operable to release said brake responsive to turning of said tailpiece to said On position thereof, and means operable responsive to turning of said tailpiece from said On position to re-engage said brake, whereby to inactivate said alarm transmitting device independently of said trigger mechanism.

12. The combination defined in claim 11 wherein said brake includes a brake member spring urged into braking engagement with an element of said alarm transmitting device, said means operable to release said brake including a projection on said tailpiece engageable with said brake member for shifting the same to released condition, said means operable to re-engage said brake comprising the spring-urging on said brake member.

13. The combination defined in claim 12 wherein said brake member comprises a lever one end of which is spring urged into braking engagement with said element of said alarm transmitting device, said tailpiece having a surface from which said projection extends, the other end of said lever extending over said surface for engagement by said projection.

14. The combination defined in claim 10 wherein said tailpiece has a hollow interior, said trigger element and plunger having portions which extend through said slot in said tailpiece to said hollow interior thereof, said portions interengaging within said hollow interior to provide said operative connection therebetween.

15. The combination defined in claim 1 wherein said entrance is in a generally central portion of said slot.

16. The combination defined in claim 5 wherein said entrance is in a generally central portion of said slot.

17. The combination defined in claim 10 wherein said entrance is in a generally central portion of said slot.

18. The combination defined in claim 10 wherein said spring means is carried by said tailpiece.

19. The combination defined in claim 18 wherein said spring means is disengageable from said trigger element in said Off position and is engaged and stressed against said trigger element in said On position.

20. The combination defined in claim 1 wherein said plunger extends slidably through an opening in said stud.

References Cited in the file of this patent

UNITED STATES PATENTS

| | | |
|---|---|---|
| 1,271,096 | Stewart | July 2, 1918 |
| 1,588,543 | Fraser | July 15, 1926 |
| 2,047,861 | Downing | July 14, 1936 |
| 2,752,773 | Abelson | July 3, 1956 |
| 2,789,527 | Davis | Apr. 23, 1957 |